United States Patent

Santini et al.

Patent Number: 5,968,241
Date of Patent: Oct. 19, 1999

[54] WASHABLE COLORING COMPOSITION

[75] Inventors: Andree F. Santini, Easton, Pa.; Richard E. Miller, Palm Coast, Fla.

[73] Assignee: Binney & Smith Inc., Easton, Pa.

[21] Appl. No.: 09/023,728

[22] Filed: Feb. 13, 1998

Related U.S. Application Data

[60] Provisional application No. 60/037,141, Feb. 14, 1997.

[51] Int. Cl.$^6$ ................................................. C09D 11/16
[52] U.S. Cl. ..................................... 106/31.32; 106/31.39; 106/31.58; 106/31.64; 106/31.71; 106/31.86; 106/31.87
[58] Field of Search .................. 106/31.32, 31.39, 106/31.58, 31.64, 31.86, 31.87

[56] References Cited

U.S. PATENT DOCUMENTS

| | | | |
|---|---|---|---|
| Re. 33,365 | 10/1990 | Blyth et al. | 135/161 |
| 2,683,647 | 7/1954 | Hagan | 8/403 |
| 2,690,953 | 10/1954 | Livak et al. | 414/476 |
| 2,920,975 | 1/1960 | Livak | 106/414 |
| 3,154,534 | 10/1964 | Gale et al. | 534/729 |
| 3,154,535 | 10/1964 | Graham et al. | 534/729 |
| 3,157,633 | 11/1964 | Kuhn | 534/729 |
| 3,337,524 | 8/1967 | Peters et al. | 534/682 |
| 3,507,850 | 4/1970 | Cohen et al. | 534/573 |
| 3,663,262 | 5/1972 | Cogan, Jr. | 8/403 |
| 3,834,823 | 9/1974 | Seregely et al. | 106/31.32 |
| 3,900,283 | 8/1975 | Hildebrand et al. | 8/534 |
| 3,949,132 | 4/1976 | Seregely et al. | 428/207 |
| 3,993,492 | 11/1976 | Woolly | 106/31.09 |
| 4,025,303 | 5/1977 | Prazak | 8/642 |
| 4,042,401 | 8/1977 | Newmann et al. | 106/31.63 |
| 4,097,233 | 6/1978 | Takahashi | 8/539 |
| 4,128,544 | 12/1978 | Schneider | 534/625 |
| 4,163,675 | 8/1979 | Hirano et al. | 106/31.43 |
| 4,193,906 | 3/1980 | Hatanaka | 106/31.07 |
| 4,202,838 | 5/1980 | Lauton et al. | 562/75 |
| 4,256,494 | 3/1981 | Sakkab | 106/31.62 |
| 4,256,598 | 3/1981 | Sakkab | 8/103 |
| 4,270,236 | 6/1981 | Zurbuchen et al. | 8/159 |
| 4,273,554 | 6/1981 | Abel | 8/557 |
| 4,283,195 | 8/1981 | Nakatsuka et al. | 8/524 |
| 4,288,363 | 9/1981 | Hurter | 534/643 |
| 4,349,349 | 9/1982 | Nakatsuka et al. | 8/527 |
| 4,371,371 | 2/1983 | Smrekar | 8/531 |
| 4,382,111 | 5/1983 | Kuwayama et al. | 428/375 |
| 4,411,666 | 10/1983 | Hashizume et al. | 8/455 |
| 4,413,998 | 11/1983 | Guth | 8/477 |
| 4,465,492 | 8/1984 | Putzar | 8/477 |
| 4,487,610 | 12/1984 | Mausezahl | 8/524 |
| 4,501,591 | 2/1985 | Ucci et al. | 8/495 |
| 4,505,944 | 3/1985 | Turner | 106/31.64 |
| 4,525,216 | 6/1985 | Nakanishi | 106/31.67 |
| 4,560,745 | 12/1985 | Weberndoerfer et al. | 106/498 |
| 4,563,190 | 1/1986 | Töpfl | 8/524 |
| 4,578,117 | 3/1986 | Nakanishi | 106/31.32 |
| 4,589,885 | 5/1986 | Opitz | 8/527 |
| 4,592,940 | 6/1986 | Blyth et al. | 428/96 |
| 4,634,606 | 1/1987 | Skogg | 106/31.64 |
| 4,664,711 | 5/1987 | Kawaguchi et al. | 106/31.28 |
| 4,680,212 | 7/1987 | Blyth et al. | 428/97 |
| 4,689,078 | 8/1987 | Koike et al. | 106/31.33 |
| 4,721,739 | 1/1988 | Brenneman et al. | 523/161 |
| 4,740,549 | 4/1988 | Okuzono et al. | 106/31.32 |
| 4,753,658 | 6/1988 | Okuzono et al. | 8/513 |
| 4,789,399 | 12/1988 | Williams et al. | 524/388 |
| 4,875,901 | 10/1989 | Payet et al. | 8/115.56 |
| 4,908,149 | 3/1990 | Moore et al. | 510/278 |
| 4,940,628 | 7/1990 | Lin et al. | 106/31.64 |
| 4,940,757 | 7/1990 | Moss, III et al. | 525/502 |
| 4,954,174 | 9/1990 | Imagawa | 106/31.64 |
| 4,978,390 | 12/1990 | Snedeker | 106/31.09 |
| 4,981,516 | 1/1991 | Kluger et al. | 106/31.32 |
| 4,988,123 | 1/1991 | Lin et al. | 106/31.64 |
| 5,004,763 | 4/1991 | Imagawa | 523/161 |
| 5,009,667 | 4/1991 | Beck et al. | 8/115.56 |
| 5,015,259 | 5/1991 | Moss, III et al. | 8/115.6 |
| 5,030,245 | 7/1991 | Hemling et al. | 8/560 |
| 5,043,013 | 8/1991 | Kluger et al. | 106/31.32 |
| 5,059,244 | 10/1991 | King et al. | 106/31.32 |
| 5,061,763 | 10/1991 | Moss, III et al. | 525/502 |
| 5,074,883 | 12/1991 | Wang | 8/115.6 |
| 5,100,471 | 3/1992 | Winnik et al. | 523/216 |
| 5,116,410 | 5/1992 | Miller | 106/31.58 |
| 5,120,359 | 6/1992 | Uzukawa et al. | 106/31.25 |
| 5,131,776 | 7/1992 | Mott | 401/198 |
| 5,137,453 | 8/1992 | Hudson | 434/408 |
| 5,169,437 | 12/1992 | You | 106/31.58 |
| 5,203,913 | 4/1993 | Yamamoto et al. | 106/32.5 |
| 5,215,576 | 6/1993 | Carrick | 106/31.01 |
| 5,217,255 | 6/1993 | Lin et al. | 106/32.5 |
| 5,288,160 | 2/1994 | Li et al. | 106/31.65 |
| 5,316,574 | 5/1994 | Fujita et al. | 106/31.75 |
| 5,318,617 | 6/1994 | Nasagawa et al. | 106/31.64 |
| 5,324,764 | 6/1994 | Fujita et al. | 106/31.64 |
| 5,334,649 | 8/1994 | Fujita | 524/558 |
| 5,338,793 | 8/1994 | Loftin | 524/571 |
| 5,389,717 | 2/1995 | Santini et al. | 524/575 |
| 5,412,021 | 5/1995 | Nakanishi | 524/523 |
| 5,456,743 | 10/1995 | Fry | 106/31.67 |
| 5,486,228 | 1/1996 | Miller et al. | 106/31.32 |
| 5,510,415 | 4/1996 | Zahrobsky et al. | 524/506 |
| 5,561,175 | 10/1996 | Imagawa | 106/31.64 |
| 5,571,311 | 11/1996 | Belmont et al. | 106/31.28 |

FOREIGN PATENT DOCUMENTS

| | | |
|---|---|---|
| 0 322 805 | 7/1989 | European Pat. Off. |
| 0 557 115 | 8/1993 | European Pat. Off. |
| 0 584 735 | 3/1994 | European Pat. Off. |
| 63-165465 | 7/1988 | Japan. |
| 63-165468 | 7/1988 | Japan. |
| 2 040 808 | 9/1980 | United Kingdom. |
| WO 90/12067 | 10/1990 | WIPO. |
| WO 91/02788 | 3/1991 | WIPO. |
| WO 93/24565 | 12/1993 | WIPO. |

*Primary Examiner*—Helene Klemanski
*Attorney, Agent, or Firm*—Leydig, Voit & Mayer, Ltd.

[57] ABSTRACT

A coloring composition comprising a polymeric dye, a dye vehicle, and an anionic dyeblocker. The coloring compositions enhance fugitivity from skin, fabrics and other household surfaces. More specifically, the invention is, in one preferred embodiment, a marker ink comprising a polymeric dye, water, and an aromatic organic sulfonate dyeblocker.

22 Claims, No Drawings

WASHABLE COLORING COMPOSITION

This application claims the benefit of U.S. Provisional Application No. 60/037,141 filed on Feb. 14, 1997.

FIELD OF THE INVENTION

The present invention relates generally to the field of washable coloring compositions for drawing and coloring purposes. In one particular aspect, the invention relates to writing instruments containing washable liquid coloring compositions, and more specifically to the formulations of coloring compositions for use in markers, which are especially suitable for use by children.

BACKGROUND OF THE INVENTION

Children's coloring markers often contain coloring compositions which are aqueous solutions of dyes commonly known as "acid dyes." The term "acid dye" is somewhat of a misnomer in that it does not describe any particular chemical type of dye, but rather refers to the traditional practice of dyeing fabrics from acidified solutions. These coloring markers have been used by children to write and color on a wide variety of substrates, but primarily on porous surfaces such as, for example, paper. Not all acid dyes are suitable for use in coloring compositions. Generally, only those acid dyes having good chroma, color intensity, and water-solubility are utilized. One drawback of acid dyes, however, is that generally they stain the skin and few are completely washable from children's clothing. Acid dyes also tend to stain many household surfaces.

Coloring compositions often also include such ingredients as humectants, biocides, and surfactants. Humectants function to improve freeze/thaw stability and to control drying out of the marker tip, while biocides serve the obvious function of preventing spoilage in the ink during the expected shelf life of the marker product. To limit a grainy appearance of the ink as it is applied and/or to enhance the flow characteristics of the ink, a small amount of surfactant is ordinarily employed.

A well known deficiency of children's coloring markers is their propensity to leave enduring stains on skin, clothing and other surfaces. While permanence is a desirable characteristic of the so-called "permanent" markers, it is one of the most objectionable properties for coloring instruments used by young children. Accordingly, much effort has been expended over many years by producers of these instruments to reduce or eliminate staining. This is attested by the rather numerous offerings of so-called "washable" markers, which, on close examination, are often found to leave stains on certain substrates, including skin and fabrics typically used in children's clothing. Most such markers achieve their limited washability by utilizing dyes which have good fugitivity from fabrics and by utilizing lowered dye concentrations in an effort to minimize skin staining. In most cases, these "washable" products still leave objectionable stains on the skin. The inks used in such markers therefore lack fugitivity from skin.

In a recent approach, as described in U.S. Pat. No. 5,116,410, an aromatic organic sulfonate is added to enhance the washability of a marker ink composition. However, the colorants utilized in the disclosed compositions are conventional acid dyes.

European Patent Application 0 557 115 discloses a washable dye-containing coloring composition containing a sulfonated phenol-formaldehyde condensation product. The compositions disclosed, however, were directed toward conventional acid dyes.

It is therefore one general object of the invention to provide a method of imparting skin fugitivity to a coloring composition.

Another object is to provide a coloring composition which, in addition to being washable from skin, exhibits enhanced launderability from fabrics and other surfaces.

A related object is to provide non-toxic coloring compositions, such as inks, which are suitable for use by young children who may make marks on themselves and their clothing.

These and other objects and advantages of the present invention, as well as additional inventive features, will be apparent to those skilled in the art from the following description of the invention and the appended claims.

BRIEF SUMMARY OF THE INVENTION

The discovery of the present invention is that one may incorporate into a coloring composition a dyeblocker additive which imparts to the composition dramatically improved fugitivity from skin. At the same time, it has been discovered that, in many instances, the dyeblocker additive will noticeably enhance fugitivity from fabrics ordinarily used in children's clothing and from other surfaces.

In one of its most general aspects, the coloring composition of the invention comprises a colorant selected from the group consisting of an acid dye and a polymeric dye and a dyeblocker. Generally, dyeblockers suitable for use in the present invention are anionic materials capable of bonding to the dye receptor sites on skin, fabrics, or other surfaces. More specifically, suitable dyeblockers are aromatic organic sulfonates and are preferably selected from the group consisting of a sulfonated naphthalene condensation product and a sulfonated phenol-formaldehyde condensation product. The coloring compositions of the invention are easily washed from the skin, and, in addition, are also more easily washed from textiles. In another general respect, the present invention includes a method of imparting skin washability to a dye-containing coloring composition by adding to a coloring composition an effective amount of an anionic dyeblocker. Preferably, the dyeblocker is selected from the group consisting of a sulfonated naphthalene condensation product and a sulfonated phenol-formaldehyde condensation product.

Thus, in one form, the invention is a washable coloring composition comprising an acid dye or polymeric dye colorant, a dye vehicle, and an aromatic organic sulfonate such as a sulfonated phenol-formaldehyde condensation product or a sulfonated naphthalene condensation product. This form of the invention is suitable for use by children. Further, a marker containing the coloring composition of the invention is provided.

DETAILED DESCRIPTION

The washable coloring composition of the present invention comprises an acid dye or polymeric dye colorant, a dye vehicle and an anionic dyeblocker. One suitable class of anionic dyeblockers are aromatic organic sulfonate dyeblockers. Preferably, the dyeblocker is selected from the group consisting of a sulfonated phenol-formaldehyde condensation product and a sulfonated naphthalene condensation product. The washable coloring compositions of the present invention exhibit enhanced fugitivity from skin and fabrics. The coloring compositions of the invention are especially suitable for use by children.

The dyeblocker component suitable for use in the invention imparts skin fugitivity and, in some instances, enhanced fabric fugitivity to the coloring compositions of the invention. Many substances may suitably perform as a dyeblocker. For example, anionic materials, such as, surfactants or polymers, which contain reactive functional groups, such as, for example, acid groups, may be used. Although the present invention is in no way limited to a mechanism by which dyeblockers operate, it is believed that the acid groups in these anionic materials react with dye-receptor sites present in the skin, fabrics, and other surfaces to form a barrier to dye receptors. Suitable anionic dyeblockers include any straight chain or aromatic compound containing, for example, highly reactive carboxylic, sulfonic, or nitric groups which possibly react with dye-receptor cites such as, for example, amino groups that are commonly present on skin, some types of fabrics, and other surfaces. Preferably, the anionic dyeblocker is an aromatic organic sulfonate. One group of preferred aromatic organic sulfonate dyeblockers are sulfonated phenol-formaldehyde condensation products, sulfonated naphthalene condensation products, or mixtures thereof. The dyeblockers useful in the practice of the present invention do not impair the stability of the coloring compositions of the invention. By stability, it is meant that the coloring composition, which includes the condensation product additive, must not precipitate nor exhibit a marked change in color or pH when maintained at a temperature of 140° F. for two weeks. Preferably, dyeblockers selected for use in the invention, in addition to imparting fugitivity from skin, also enhance fugitivity from textiles and other surfaces. Suitable dyeblockers may often be film-forming, which may further prevent the migration of dyes toward the reactive sites of a substrate, thereby reducing staining.

Sulfonated phenol-formaldehyde condensation product dyeblockers useful in the practice of the invention are described in U.S. Pat. No. 4,501,591. Suitable sulfonated phenol-formaldehyde condensation products may be, but are not limited to, linear, low molecular weight condensation products; that is products having an average molecular weight of less than about 1000, for example, in the range of 250 to 700. Such products are water-soluble and may be prepared by conventional art-recognized techniques, for example, by condensation of formaldehyde with one or more phenols in a mole ratio of about 1.0 to 0.8, phenol(s) to formaldehyde, at a pH of less than 7 using an acid catalyst such as HCl, wherein at least one of the phenols is a phenolsulfonic acid or alkali metal salt thereof. Preferably, the phenols comprise, in addition to the sulfonic acid or salt thereof, a sulfone, for example, dihydroxy aromatic diphenol sulfone. Such condensation products contain, in addition to sulfonic acid groups or alkali metal salts thereof, sulfone groups.

Other sulfonated phenol-formaldehyde condensation products are described in U.S. Patent Re. 33,365, and U.S. Pat. Nos. 4,908,149, 4,592,940 and 4,680,212.

One sulfonated phenol-formaldehyde condensation product dyeblocker suitable for use in compositions of the invention is Aerofix N™, commercially available from Aerochem Corporation. Aerofix N™ is supplied as an aqueous solution of the phenol-formaldehyde condensation product containing about 17% by weight active condensation product ingredient. Other sulfonated phenol-formaldehyde condensation products suitable for use in the compositions of the invention are Intratex N™ available from Crompton and Knowles Corporation (dispersion containing about 18% by weight active condensation product ingredient), and Gascofix NY™ available from GCI Technologies, Inc. (dispersion containing about 29% by weight active condensation product ingredient). Compatible mixtures of these sulfonated phenol-formaldehyde condensation products may also be used. The sulfonated phenol-formaldehyde condensation product, Aerofix N™, is preferred for use in compositions of the invention. Aerofix N™ dramatically enhanced skin washability and fabric launderability in compositions of the invention. Other sulfonated phenol-formaldehyde condensation products may produce equivalent, or even better, results and are within the scope of the invention.

A sulfonated naphthalene condensation product dyeblocker suitable for use in coloring compositions of the invention is Tamol SN™. Tamol SN™ is commercially available from Rohm and Haas and is supplied in solid form containing 100% by weight active ingredient. Other sulfonated naphthalene condensation products may produce equivalent, or even better, results and are within the scope of the invention. The various dyeblockers discussed above may be used alone or in combination where the dyeblockers are compatible with one another.

Other suitable dyeblockers for the coloring composition of the invention are anionic surfactants. One such suitable anionic surfactant is Dowfax 8390™ which is commercially available from Dow Chemical Co. Dowfax 8390™ is an alkylated diphenyloxide disulfonate and, more specifically, it is disodium hexadecyldiphenyloxide disulfonate (15–35%) and disodium dihexadecyldiphenyloxide disulfonate (5–10%).

The specific mechanism by which the dyeblocker additive imparts skin fugitivity and enhances fabric fugitivity is not known. However, it is believed that the condensation products tie up the reactive sites of the substrates to which coloring compositions containing the dyeblocker are applied. The dye used as a colorant in compositions of the invention then has a reduced ability to physically or chemically associate with the substrate, be it skin or fabric.

The sulfonated phenol-formaldehyde condensation product Aerofix N™ was tested in numerous water-based dye compositions comprising colorants, preservatives, and humectants. Compositions of the invention should contain a sufficient amount of the sulfonated phenol-formaldehyde condensation product to impart skin fugitivity and enhance fabric fugitivity of the composition.

The amount of dyeblocker additive present in the coloring compositions of the invention depends upon the specific condensation product used. At a minimum, the condensation product must be present in an amount sufficient to impart enhanced skin, fabric, and surface fugitivity. This effect is seen with as little as about 1% by weight of the active condensation product ingredient in the total coloring composition. Even greater washability is achieved when about 3.5% by weight of the active sulfonated phenol-formaldehyde condensation product ingredient is used where the dyeblocker additive is Aerofix N™. In general, a greater amount of condensation product additive present in the coloring composition leads to better washability from fabric, skin and other surfaces. However, at a certain point, the addition of more condensation product does not yield any improvement in the washability of the composition. The upper limit of the dyeblocker additive concentration may also be imposed by constraints on the viscosity and the long term stability of compositions of the invention. For example, the coloring composition cannot have a significantly viscous consistency or it will not flow through a marker nib when used in the form of a marker ink. Accordingly, the concentration of condensation product additive is preferably in an amount of from about 2% to about 15% by weight of the active condensation product ingredient in the total coloring composition.

In general, where the Aerofix N™ solution is used, the beneficial effect of the additive occurs at a concentration of at least about 10% by weight of the Aerofix N™ solution based on the total coloring composition. Where Aerofix N™ is the selected dyeblocker, it is present in an amount of from about 5% to about 60% by weight of the Aerofix N™ solution based on the total coloring composition of the invention. Preferably, the Aerofix N™ component is present in an amount of from about 15% to about 40% by weight of the Aerofix N™ solution based on the total coloring composition. Most preferably, about 30% by weight of the Aerofix N™ solution based on the total coloring composition is used in coloring compositions of the invention.

The coloring compositions of the invention also include one or more colorants. Suitable colorants are dyes which are preferably selected which otherwise are known to have good launderability from fabrics. When used in the composition of the invention, such dyes not only enhance washability from skin, but also enhance launderability from fabric as well.

One type of suitable colorant for use in compositions of the present invention are acid dyes. By way of illustration, and not in limitation, acid dyes that have been found suitable for use in this invention are Acid Violet 12, Acid Green 3, Acid Blue 9, Acid Yellow 17, Acid Yellow 23, Acid Red 52 and Acid Red 388. Yellow F.D.& C. #6 may also be used.

Another category of suitable colorants for use in the present invention is polymeric dyes. Polymeric dyes are characterized as having polymeric chains covalently bonded to a chromophore molecule. By way of illustration, and not limitation, polymeric dyes suitable for use in compositions of the invention include Palmer Scarlet™, Palmer Blue™, Palmer Magenta™, and Experimental Palmer FL Red A 10™. These polymeric dyes are commercially available from Milliken Chemical and may be covered by one or more of U.S. Pat. Nos. 4,981,516, 5,043,013, and 5,059,244, the disclosures of which are incorporated herein by reference. Other polymeric dyes useful in the practice of the invention include polyalkyleneoxy-substituted chromophore compounds such as, for example, alkyleneoxy-substituted methine colorants. While certain coloring compositions containing polymeric dyes have been removed from skin by rubbing with soap and water, the coloring compositions of the present invention can be rinsed off using water alone. Also, the coloring compositions of the present invention can be easily washed off or more completely removed from many previously staining surfaces such as wallpaper, painted walls, wood, etc.

Another type of colorant suitable for use in the washable coloring compositions of the present invention is pigments. Examples of suitable pigments include inorganic pigments such as titanium dioxide or ferric oxide, or organic pigments such as carbon black, phthalocyanines (e.g., copper phthalocyanine blue), azo pigments, quinacridones, anthraquinones, dioxazines, indios, thioindios, perynones, perylenes, indolenones and azo-azomethines. Encapsulated pigments may also be utilized. To achieve good coloring and promote compatibility with the remaining ink components, the pigment may be utilized in the form of an aqueous dispersion, inasmuch as pigments are by definition insoluble materials. Pigment dispersions are commercially available which are combinations of a pigment, an aqueous based character, and a surfactant or dispersant system. A pigment dispersion may also be prepared specifically for use in the coloring compositions of the invention. From the standpoint of convenience, a commercial pigment dispersion is preferred for use in the present invention. Typical commercial dispersions contain 30 to 74% by weight active pigment ingredients. Examples of suitable pigment dispersions include Hostafme Rubine F6B (C.I. Pigment Red 184 dispersion), Blue B2G (Pigment Blue 15-3) and Black 7 (Pigment Black T), marketed by Hoechst Celanese Corporation under the tradename "Hostafmes Dispersions."

The coloring compositions of the invention may contain polymeric dyes, acid dyes, pigments, or mixtures thereof. Additionally, the compositions may contain two or more polymeric dyes, two or more acid dyes, or two or more pigments to achieve the desired color. The colorant is preferably present in an amount of from about 2% to about 20% by weight of the total coloring composition of the invention. The minimum concentration of colorant which will produce a workable coloring composition is governed by the color intensity desired, though as little as 0.5% colorant may be sufficient for certain applications. The maximum workable concentration of colorant is determined largely by the ability to maintain a stable composition, and can vary widely depending upon the concentration of other components. The maximum amount of colorant is also a function of the characteristics of the desired end product, though a practical upper limit in the formulation of the composition of the invention as, for example, an marker ink, is about 30% by weight of the total coloring composition of the invention. Higher concentrations may defeat washability and yield an undesirably high viscosity. Preferably, the coloring composition should have a viscosity less than 6 cps when used as a marker ink.

When a commercial pigment dispersion is utilized, a practical limit is imposed on the concentration of pigment in the dispersion. The preferred concentration range for most applications is from about 1% to about 10% active pigment by weight of the coloring composition. A concentration of about 3% active pigment by weight is ordinarily required to ensure good coloration in a typical marker ink and most preferred is a concentration of active pigment in a range of about 1.5% to about 5% by weight of the coloring composition.

The coloring composition of the present invention also includes an amount of an aqueous or other dye vehicle effective to form a solution of the remaining components. The preferred dye vehicle is water. The maximum amount of dye vehicle is the amount which results in a stable composition and which is capable of forming a mark having the minimum acceptable visibility on a substrate. The minimum amount of water is that necessary to form a stable solution of the components of the coloring composition and provide a composition which can be freely dispensed from the selected dispensing element, where the composition is to be used as a marker ink. Other suitable dye vehicles include alcohol or other water-miscible solvents, such as, for example, a 30% denatured alcohol solution. Compatible mixtures of water and alcohol or other water-miscible solvents may also be used as a dye vehicle. Suitable water/solvent dye vehicles may contain from 0% to 100% alcohol or other water-miscible solvents. Preferably, the dye vehicle may comprise from 0% to about 50% alcohol or other water-miscible solvents. The proportion of dye vehicle contemplated herein is from about 30% to about 90% by weight of the total coloring composition of the invention. Some or all of the water may be contributed by water found as a portion of one or more of the other components.

A film forming component may also be added to the coloring compositions of the present invention to provide enhanced washability. Suitable film forming components include starches, water-soluble resins, and alkali-soluble resins. A wide range of starches are suitable including, for example, warm water soluble starch and cold water soluble starch. Preferably, the starches, water-soluble resins, or alkali-soluble resins may be added in an amount of from about 2% to about 30% by weight of the coloring composition to beneficially enhance washability. The combination of a dyeblocker and starch in the present invention enhances washability on skin, walls, wallpaper, wood and other surfaces.

One suitable starch for use in compositions of the present invention is Dri-sweet 42 manufactured by Hubinger Co. Dri-sweet 42 is a cold water soluble starch. Another suitable cold water soluble starch is ICB 3000 manufactured by Staley.

A suitable water-soluble resin for use in the instant invention is polyvinylpyrrolidone sold under the tradename PVP K-15™ by GAF Chemicals Corporation. PVP K-15™ is typically supplied in 30% by weight solution of polyvinylpyrrolidone (i.e., 70% water). Different molecular weight polyvinylpyrrolidone polymers, such as PVP K-30™, and modified polyvinylpyrrolidone polymers, such as polyvinyl acetate-modified polyvinylpyrrolidone, may also be used in compositions of the invention. Other suitable resins for use in compositions of the invention include, for example, but are not limited to, natural resins, such as gum arabic, rosin, or shellac; modified rosins such as rosin esters, hydrogenated rosins, rosin-modified maleic acid resins or rosin-modified phenol resins; various phenol-resins; cellulosic resins such as ethyl cellulose resins or acetyl cellulose resins; ketone resins, polyvinyl alcohol, polyvinyl acetate resins, petroleum resins, polyvinyl butyral resins, vinylpyrrolidone-vinyl acetate copolymer resins or polyacrylic acid ester resins. Mixtures of two or more suitable and compatible resins may also be employed in the present invention.

The coloring compositions of the invention are especially suitable for use as a marker ink in which the dye vehicle is water. The ink may be supplied in a delivery system, such as a marking instrument, to enable children to color or draw on surfaces such as paper. Suitable nibs for use in such a system are bonded fiber or sintered plastic nibs. A marking pen containing the coloring composition of the invention in the form of an ink may generally take the form of any conventional marker. Preferably, the marker uses a bonded fiber or sintered plastic nib. The marker reservoir containing the ink can be any standard marker delivery system including, but not limited to, acetate, polyester, or polypropylene fiber systems. In addition, a fiberless system may be used.

In a preferred embodiment of invention, the coloring composition of the invention is in the form of a marker ink. The ink contains a colorant, water, and an anionic dyeblocker. Preferably, the dyeblocker additive is an aromatic organic sulfonate and, more preferably, it is selected from the group consisting of sulfonated naphthalene condensation products, a sulfonated phenol-formaldehyde condensation products, and mixtures thereof. This inventive marker ink exhibits favorable washability characteristics from skin, fabric and other household surfaces.

Compositions of the present invention may, when in the form of an ink, also advantageously include a humectant, a surfactant, a preservative, a defoamer, and/or a pH regulant. These materials and their functions are well known, and their mention here is by way of illustration only. Generally, any effective amount of the additive may be used so long as the stability of the coloring composition is not adversely affected and the composition is suitable for use in the desired end product.

For example, it may be possible to include a humectant in a marker ink to retard the evaporation of water from the ink solution. This avoids unduly rapid drying of the ink in the marker nib which can cause clogging of the nib and impair the function of the marker. Further, a humectant may improve freeze/thaw stability of the inventive ink compositions. Typical humectants include polyhydric alcohols such as glycerine, propylene glycol, ethylene glycol, and diethylene glycol, hydroxylated starches, low molecular weight (m.w.=200–400) poly(ethylene glycols), and mixtures of these materials. Any effective amount of humectant may be used although a generally useful concentration range for these humectants is from about 5% up to about 30% by weight of the total coloring composition.

Surfactants in any effective amount (generally up to about 0.1% by weight) may also be included in the preferred marker ink compositions of the invention for the purpose of adjusting such properties as viscosity (for proper dispensing of ink through the nib), and surface tension (for good flow properties and nonporous surface wetting). Anionic surfactants, nonionic surfactants, such as poly (ethylene glycol) ether, alkylaryl polyether alcohol, fluorinated alkyl esters, and mixtures of such materials are preferred for use in the compositions of the invention when in the form of marker inks.

Preservatives of conventional types are also advantageously employed in the compositions of the invention to extend the shelf life of the composition. The preservative preferably serves as both a bactericide and a fungicide. Some typical preservatives useful in the present invention include methyl p-hydroxybenzoate, glutaraldehyde, hydroxybenzoic acid esters, 3-iodo-2-propynyl butyl carbamate, bicyclic oxazolidones, and a biocide comprising as the active ingredients 5-chloro-2-methyl-4-isothiazolin-3-one and, 2-methyl-4-isothiazolin-3-one.

Preservatives are usually effective when present in any effective amount but generally are present in amounts of from about 0.1% up to about 1% by weight. Preferred preservatives include Kathon PFM™ (isothiazolinones) manufactured by Rohm and Haas, and Nuosept 95™ (bicyclic oxazolidines solutions) manufactured by Huls America The pH of the coloring compositions of the present invention is preferably in the range of about 3.0 to about 10.0, more preferably about 4.0 to about 9.0. To maintain this pH, a pH regulant may be employed. Preferably, neutralized versene is used as a pH regulant. The pH regulant may be added in an amount ranging from about 0% to about 20% by weight. In one preferred composition, the pH regulant, neutralized versene, is added in an amount of about 10% by weight of the total marker ink composition.

The coloring compositions of the present invention may also contain a defoamer to prevent foaming during mixture of the various components. Suitable defoamers include silicones and siloxanes. The preferred defoamer is Tego Foamax 800™ marketed by Goldschmidt Chemical Corp. Other suitable defoamers include Zerofome AF-200™ marketed by NuTech Corp., Surfynol DF58™ marketed by Air Products, and Foamaster H™ marketed by Henkel. The addition of defoamer to the coloring compositions of the present invention does not adversely affect the washability of these compositions when the compositions are used as marker inks. The amount of defoamer depends upon the amounts of other components present in the coloring composition, although typically about 0.1% to about 5% by weight of the total coloring composition is used.

The coloring compositions and marker inks of the present invention can be used to write on a broad range of substrates including both porous and non-porous surfaces. The present compositions can be applied to porous surfaces which allow liquids to pass through its pores. Examples of common porous surfaces include paper, cardboard, fabric, raw wood, some types of chalkboards and some painted surfaces. Moreover, the present compositions can be applied to non-porous surfaces which do not allow liquids to pass through due to a lack of pores. Exemplary nonporous surfaces include glass, windows, mirrors, plastics, overhead projector films, ceramic tiles, sealed papers and cardboards, metals (e.g., stainless steel), some painted surfaces, and sealed wood. The present coloring compositions will wet most nonporous surfaces and form a film.

The coloring compositions of the present invention can be prepared in any suitable manner. For example, polymeric dye, dye vehicle, and anionic dyeblocker along with other optional components (e.g., film forming components, preservatives, and humectants) can be added to a suitable vessel and mixed until a suitable solution is obtained.

EXAMPLES

Examples of coloring compositions of the present invention are as follows. These examples further illustrate the present invention but, of course, should not be construed as in any way limiting its scope. Quantities are in percent by weight of the total composition.

Different coloring compositions may be prepared using polymeric dyes and a dyeblocker additive. These compositions may be formulated in the form of marker inks. Examples 1–6 are illustrative of the wide variety of possible colors. Coloring compositions containing a dyeblocker that were evaluated are set forth below in Examples 7–23. The coloring compositions in Comparative Examples 1–2 do not contain a dyeblocker.

|  | wt. % |
|---|---|
| Example 1 (Blue) | |
| Deionized water (dye vehicle) | 55.22 |
| Palmer Blue (polymeric dye) | 5.00 |
| Aerofix N (phenol-formaldehyde condensation product) | 29.40 |
| Glycerine (humectant) | 10.00 |
| Nuosept 95 (preservative) | 0.30 |
| Kathon PFM (preservative) | 0.08 |
| Example 2 (Green) | |
| Deionized water (dye vehicle) | 63.97 |
| Palmer Blue (polymeric dye) | 6.50 |
| Acid Yellow 23 (acid dye) | 1.50 |
| Aerofix N (phenol-formaldehyde condensation product) | 17.65 |
| Glycerine (humectant) | 10.00 |
| Nuoset 95 (preservative) | 0.30 |
| Kathon PFM (preservative) | 0.08 |
| Example 3 (Red) | |
| Deionized water (dye vehicle) | 58.47 |
| Palmer Scarlet (polymeric dye) | 15.00 |
| Palmer FL Red (polymeric dye) | 3.00 |
| Dowfax 8390 (dyeblocker additive) | 13.15 |
| Glycerine (humectant) | 10.00 |
| Nuosept 95 (preservative) | 0.30 |
| Kathon PFM (preservative) | 0.08 |
| Example 4 (Violet) | |
| Deionized water (dye vehicle) | 69.18 |
| Palmer Blue (polymeric dye) | 0.54 |
| Palmer Magenta (polymeric dye) | 12.00 |
| Dowfax 8390 (dyeblocker additive) | 7.90 |
| Glycerine (humectant) | 10.00 |
| Nuosept 95 (preservative) | 0.30 |
| Kathon PFM (preservative) | 0.08 |
| Example 5 (Brown) | |
| Deionized water (dye vehicle) | 76.57 |
| Palmer Blue (polymeric dye) | 0.80 |
| Palmer Magenta (polymeric dye) | 4.00 |
| FD & C Yellow #6 (acid dye) | 2.00 |
| Tamol SN (naphthalene condensation product) | 6.25 |
| Glycerine (humectant) | 10.00 |
| Nuosept 95 (preservative) | 0.30 |
| Kathon PFM (preservative) | 0.08 |
| Example 6 (Black) | |
| Deionized water (dye vehicle) | 64.23 |
| Palmer Blue (polymeric dye) | 9.72 |
| Palmer Magenta (polymeric dye) | 9.72 |
| FD & C Yellow #6 (acid dye) | 2.20 |
| Tamol SN (naphthalene condensation product) | 3.75 |
| Glycerine (humectant) | 10.00 |
| Nuosept 95 (preservative) | 0.30 |
| Kathon PFM (preservative) | 0.08 |
| Example 7 (Blue) | |
| Deionized water (dye vehicle) | 57.32 |
| Palmer Blue (polymeric dye) | 5.00 |
| Intratex N (phenol-formaldehyde condensation product) | 27.30 |
| Glycerine (humectant) | 10.00 |
| Nuosept 95 (preservative) | 0.30 |
| Kathon PFM (preservative) | 0.08 |

Example 8 (Blue)

| | wt. % |
|---|---|
| Deionized water (dye vehicle) | 72.82 |
| Palmer Blue (polymeric dye) | 5.00 |
| Intratex N (phenol-formaldehyde condensation product) | 11.80 |
| Glycerine (humectant) | 10.00 |
| Nuosept 95 (preservative) | 0.30 |
| Kathon PFM (preservative) | 0.08 |

Example 9 (Blue)

| | wt. % |
|---|---|
| Deionized water (dye vehicle) | 49.62 |
| Palmer Blue (polymeric dye) | 10.00 |
| Aerofix N (phenol-formaldehyde condensation product) | 20.00 |
| Tamol SN (naphthalene condensation product) | 10.00 |
| Glycerine (humectant) | 10.00 |
| Nuosept 95 (preservative) | 0.30 |
| Kathon PFM (preservative) | 0.08 |

Example 10 (Blue)

| | wt. % |
|---|---|
| Deionized water (dye vehicle) | 10.82 |
| Palmer Blue (polymeric dye) | 10.00 |
| Aerofix N (phenol-formaldehyde condensation product) | 58.80 |
| Dri-sweet 42 (starch) | 10.00 |
| Glycerine (humectant) | 10.00 |
| Nuosept 95 (preservative) | 0.30 |
| Kathon PFM (preservative) | 0.08 |

Example 11 (Blue)

| | wt. % |
|---|---|
| Deionized water (dye vehicle) | 43.30 |
| Palmer Blue (polymeric dye) | 20.00 |
| Dowfax 8390 (dyeblocker additive) | 26.32 |
| Glycerine (humectant) | 10.00 |
| Nuosept 95 (preservative) | 0.30 |
| Kathon PFM (preservative) | 0.08 |

Example 12 (Blue)

| | wt. % |
|---|---|
| Deionized water (dye vehicle) | 35.22 |
| Palmer Blue (polymeric dye) | 20.00 |
| Aerofix N (phenol-formaldehyde condensation product) | 29.40 |
| Tamol SN (naphthalene condensation product) | 5.00 |
| Glycerine (humectant) | 10.00 |
| Nuosept 95 (preservative) | 0.30 |
| Kathon PFM (preservative) | 0.08 |

Example 13 (Blue)

| | wt. % |
|---|---|
| Deionized water (dye vehicle) | 32.62 |
| Palmer Blue (polymeric dye) | 20.00 |
| Palmer FL Red (polymeric dye) | 2.00 |
| Aerofix N (phenol-formaldehyde condensation product) | 30.00 |
| Dri-sweet 42 (starch) | 10.00 |
| Glycerine (humectant) | 5.00 |
| Nuosept 95 (preservative) | 0.30 |
| Kathon PFM (preservative) | 0.08 |

Example 14 (Red)

| | wt. % |
|---|---|
| Deionized water (dye vehicle) | 29.62 |
| Palmer Scarlet (polymeric dye) | 20.00 |
| Aerofix N (phenol-formaldehyde condensation product) | 30.00 |
| Dri-sweet 42 (starch) | 10.00 |
| Glycerine (humectant) | 10.00 |
| Nuosept 95 (preservative) | 0.30 |
| Kathon PFM (preservative) | 0.08 |

Example 15 (Violet)

| | wt. % |
|---|---|
| Deionized water (dye vehicle) | 45.62 |
| Palmer Blue (polymeric dye) | 2.00 |
| Palmer FL Red (polymeric dye) | 2.00 |
| Aerofix N (phenol-formaldehyde condensation product) | 30.00 |
| Dri-sweet 42 (starch) | 10.00 |
| Glycerine (humectant) | 10.00 |
| Nuosept 95 (preservative) | 0.30 |
| Kathon PFM (preservative) | 0.08 |

Example 16 (Brown)

| | wt. % |
|---|---|
| Deionized water (dye vehicle) | 34.50 |
| Palmer Blue (polymeric dye) | 1.76 |
| Palmer Scarlet (polymeric dye) | 11.36 |
| FDC Yellow #6 (acid dye) | 2.00 |
| Aerofix N (phenol-formaldehyde condensation product) | 30.00 |
| Dri-sweet 42 (starch) | 10.00 |
| Glycerine (humectant) | 10.00 |
| Nuosept 95 (preservative) | 0.30 |
| Kathon PFM (preservative) | 0.08 |

Example 17 (Blue)

| | wt. % |
|---|---|
| Deionized water (dye vehicle) | 69.62 |
| Palmer Blue (polymeric dye) | 20.00 |

-continued

| | wt. % |
|---|---|
| Tamol SN (dyeblocker additive) | 10.00 |
| Nuosept 95 (preservative) | 0.08 |
| Kathon PFM (preservative) | 0.30 |
| Example 18 (Blue) | |
| Deionized water (dye vehicle) | 68.62 |
| Palmer Blue (polymeric dye) | 20.00 |
| Acid Red 52 (acid dye) | 1.00 |
| Tamol SN (dyeblocker additive) | 10.00 |
| Nuosept 95 (preservative) | 0.08 |
| Kathon PFM (preservative) | 0.30 |
| Example 19 (Blue) | |
| Deionized water (dye vehicle) | 51.62 |
| Palmer Blue (polymeric dye) | 20.00 |
| Tamol SN (dyeblocker additive) | 10.00 |
| ICB 3000 (starch) | 13.00 |
| Propylene glycol (humectant) | 5.00 |
| Nuosept 95 (preservative) | 0.08 |
| Kathon PFM (preservative) | 0.30 |
| Example 20 (Yellow) | |
| Deionized water (dye vehicle) | 69.62 |
| Acid Yellow 17 (acid dye) | 2.00 |
| Tamol SN (dyeblocker additive) | 10.00 |
| ICB 3000 (starch) | 13.00 |
| Propylene glycol (humectant) | 5.00 |
| Nuosept95 (preservative) | 0.08 |
| Kathon PFM (preservative) | 0.30 |
| Example 21 (Blue) | |
| Deionized water (dye vehicle) | 58.62 |
| Palmer Blue polymeric dye) | 20.00 |
| Acid Red 52 (acid dye) | 1.00 |
| Tamol SN (dyeblocker additive) | 10.00 |
| ICB 3000 (starch) | 10.00 |
| Nuosept 95 (preservative) | 0.08 |
| Kathon PFM (preservative) | 0.30 |
| Example 22 (Blue) | |
| Deionized water (dye vehicle) | 34.62 |
| Palmer Blue (polymeric dye) | 20.00 |
| Aerofix N (phenol-formaldehyde condensation product) | 30.00 |
| Dri-sweet 42 (starch) | 10.00 |

-continued

| | wt. % |
|---|---|
| Nuosept 95 (Preservative) | 0.08 |
| Kathon PFM (Preservative) | 0.30 |
| Example 23 (Blue) | |
| Deionized water (dye vehicle) | 55.92 |
| Palmer Blue (Polymeric dye) | 10.00 |
| Dowfax 8390 (dyeblocker additive) | 11.20 |
| Tamol SN (dyeblocker additive) | 12.50 |
| Glycerine (humectant) | 10.00 |
| Nuosept 95 (preservative) | 0.08 |
| Kathon PFM (preservative) | 0.30 |
| Comparative Example 1 (Blue) | |
| Deionized water (dye vehicle) | 79.62 |
| Palmer Blue (polymeric dye) | 20.00 |
| Nuosept 95 (preservative) | 0.08 |
| Kathon PFM (preservative) | 0.30 |
| Comparative Example 2 (Blue) | |
| Deionized water (dye vehicle) | 78.62 |
| Palmer Blue (polymeric dye) | 20.00 |
| Acid Red 52 (acid dye) | 1.00 |
| Nuosept 95 (preservative) | 0.08 |
| Kathon PFM (preservative) | 0.30 |

TEST PROCEDURES

A. Skin Fugitivity

The fugitivity from skin of the compositions of the invention cited in the above examples was measured by the following test:

1. Wash hands with soap and warm water. The pre-stain cleansing removes excess oil and dirt from the skin and provides a more consistent skin surface for testing. Allow the skin to dry for 30 seconds.

2. With the compositions of the invention used in a marker having a sintered plastic nib, draw a stripe on the palm of the hand with the flat side of the nib. In the usual case, a ¼ inch wide by 1 inch long stripe works well. Apply enough pressure and/or multiple passes to develop a stripe with good color intensity. If it is desired to make a comparison among two or more compositions, more than one stripe may be drawn. Let stripes dry for fifteen minutes.

3. In the case of a marker, place hand under tap and briefly rinse off excess ink with warm water.

4. Wash hands with Ivory brand bar soap in the following manner: lather using a minimum amount of soap; replace soap in soap dish; rub hands together briskly with modest pressure for 30 seconds; rinse away soap.

5. Wipe hands dry with paper towels, and complete the drying with a relatively dry towel. A dry towel will help to rub off residual traces of ink.

B. Fabric Fugitivity

The fugitivity from fabric of the compositions of the invention was measured by the following test.

1. Pre-wash test fabrics with bleach, non-staining water softener and ordinary household phosphate detergent powder using 120° F. hot water as directed in ASTM D4265-83, and dry.

2. Cut test swatches of pre-washed fabrics to be tested.

3. Deposit marker inks onto fabric swatches and allow to dry for 4 hours.

4. Staple a group of stained swatches to the edges of a bath towel.

5. Add a dummy load of unstained fabrics to provide a four pound wash load. Wash the load in a washing machine for 12 minutes with a warm (about 80° F. to about 90° F.)/cold cycle or a cold (about 35° F. to about 55° F.)/cold cycle.

6. Dry the load in a dryer.

7. Detach the test swatches from the carrier towel, iron, and observe degree of staining.

C. Wallpaper Stain Test

The washability from wallpaper of the compositions of the invention was measured by the following test:

1. Inks were marked on an average grade of wallpaper and allowed to dry for one hour.

2. Marks were then wiped with a damp towel.

3. The degree of staining was then observed.

EVALUATION OF TEST DATA

Skin and fabric fugitivity data are based on a visual rating system as follows:

0=no stain 0.5=very light stain

1=light stain

2=light to moderate stain

3=moderate to heavy stain

An asterisk (*) following the numerical rating denotes that particular degree of staining after only a water rinse instead of after rubbing with soap and water.

The viscosity, pH and skin fugitivity of the coloring compositions in Examples 7–16 and Examples 17–23 are set forth in Tables I and II, respectively. In addition, the viscosity, pH and skin fugitivity of the coloring compositions in Comparative Examples 1–2 are set forth in Table II. Skin fugitivity was measured on different individuals. Because washability results will vary by individual, the range of observed skin fugitivity for each of the coloring compositions examples is provided.

TABLE I

| | Skin Fugitivity | | |
|---|---|---|---|
| Example Number | viscosity (cps) | pH | Skin Fugitivity |
| 7 | N/A | N/A | 0* |
| 8 | N/A | N/A | 0 |
| 9 | 2.81 | 8.1 | 0*–0 |
| 10 | 4.91 | 7.9 | 0*–0 |
| 11 | N/A | N/A | 0.5 |
| 12 | N/A | N/A | 0 |
| 13 | 3.96 | N/A | 0–1 |
| 14 | 4.61 | N/A | 0 |
| 15 | N/A | N/A | 0*–0 |
| 16 | N/A | N/A | 0 |

TABLE II

| | Skin Fugitivity/Wallpaper Staining | | | | |
|---|---|---|---|---|---|
| | | | Skin Fugitivity | | |
| Example Number | viscosity (cps) | pH | rinse | wash | Wallpaper |
| 17 | 1.91 | 8.0 | 0.5* | 0 | 0 |
| 18 | 2.0 | 7.8 | 0.5* | 0 | 0 |
| 19 | 6.8 | 8.0 | 0* | 0 | 0 |
| 20 | 5.0 | 7.2 | 0* | 0 | 0 |
| 21 | 3.1 | 7.4 | 1.5* | 0.5 | 0.5 |
| 22 | 3.6 | 8.0 | 0* | 0 | 0 |
| 23 | 2.5 | 8.4 | 0* | 0 | 0 |
| Comp. 1 | 1.23 | 7.0 | 2 | 1 | 1 |
| Comp. 2 | 1.5 | 6.6 | 2.5 | 1 | 1 |

From the foregoing Examples 7–23, it can be seen that the coloring compositions of the present invention containing a dyeblocker exhibit enhanced fugitivity from skin and wallpaper.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A coloring composition comprising:

(a) a colorant selected from the group consisting of a polymeric dye, a pigment, and mixtures thereof;

(b) a dye vehicle; and (c) an anionic dyeblocker in an amount sufficient to enhance the fugitivity of said composition from skin.

2. The coloring composition according to claim 1, wherein said anionic dyeblocker is an aromatic organic sulfonate.

3. The coloring composition according to claim 2, wherein said aromatic organic sulfonate is selected from the group consisting of a sulfonated phenol-formaldehyde condensation product, a sulphonated naphthalene condensation product, and mixtures thereof.

4. The coloring composition according to claim 3, wherein said aromatic organic sulfonate is a sulfonated phenol-formaldehyde condensation product in an amount of from about 1% to about 15% by weight of the condensation product in said coloring composition.

5. The coloring composition according to claim 3, wherein said aromatic organic sulfonate is a sulphonated naphthalene condensation product in an amount of from about 1% to about 15% by weight of the condensation product in said coloring composition.

6. The coloring composition according to claim 1, further comprising an acid dye.

7. The coloring composition according to claim 6, wherein said acid dye is selected from the group consisting of Acid Violet 12, Acid Green 3, Acid Blue 9, Acid Yellow 17, Acid Yellow 23, Acid Red 52, Yellow F.D.& C. #6, and mixtures thereof.

8. The coloring composition according to claim 1, wherein said dye vehicle is selected from the group consisting of water, alcohol, and mixtures thereof.

9. The coloring composition according to claim 8, wherein said water is present in an amount of from about 30 wt. % to about 90 wt. % by weight of the total coloring composition.

10. The coloring composition according to claim 8, wherein said dye vehicle comprises from 0% to about 50% alcohol.

11. The coloring composition according to claim 1, further comprising a starch.

12. The coloring composition according to claim 11, wherein said starch is present in an amount of from about 2% to about 30% by weight of said coloring composition.

13. The coloring composition according to claim 1, further comprising a film forming resin selected from the group consisting of water-soluble resin and alkali-soluble resin.

14. A marker ink comprising:
 (a) a colorant selected from the group consisting of a polymeric dye, a pigment, and mixtures thereof;
 (b) water; and
 (c) an anionic dyeblocker in an amount sufficient to enhance the fugitivity of said composition from skin.

15. The marker ink according to claim 14, wherein said anionic dyeblocker is an aromatic organic sulfonate.

16. The marker ink according to claim 15, wherein said aromatic organic sulfonate is selected from the group consisting of a sulfonated phenol-formaldehyde condensation product, a sulfonated naphthalene condensation product, and mixtures thereof.

17. A marking instrument containing an ink, said ink comprising:
 (a) a colorant selected from the group consisting of a polymeric dye, a pigment, and mixtures thereof;
 (b) water; and
 (c) an anionic dyeblocker in an amount sufficient to enhance the fugitivity of said composition from skin.

18. The marking instrument according to claim 17, wherein said anionic dyeblocker is an aromatic organic sulfonate.

19. The marker ink according to claim 18, wherein said aromatic organic sulfonate is selected from the group consisting of a sulfonated phenol-formaldehyde condensation product, a naphthalene condensation product, and mixtures thereof.

20. A method of imparting skin and fabric fugitivity to a composition containing a colorant, comprising adding to said composition an aromatic organic sulfonate selected from the group consisting of a sulfonated phenol-formaldehyde condensation product, a sulfonated naphthalene condensation product, and mixtures thereof in an amount sufficient to enhance the fugitivity of said composition from skin.

21. An aqueous ink composition suitable for use in a marking instrument, comprising:
 (a) polymeric dye in an amount of from about 2 wt. % to about 30 wt. % by weight of the aqueous ink composition; and,
 (b) an aromatic organic sulfonate in an amount of from about 1% to about 15% by weight of the aromatic organic sulfonate in said aqueous ink composition.

22. The aqueous ink composition according to claim 21, further comprising a film forming component selected from the group consisting of a starch, a water-soluble resin, a alkali-soluble resin, and mixtures thereof in an amount of from about 2% to about 30% by weight of the aqueous ink composition.

* * * * *

UNITED STATES PATENT AND TRADEMARK OFFICE
CERTIFICATE OF CORRECTION

PATENT NO. : 5,968,241
DATED : October 19, 1999
INVENTOR(S) : Santini et al.

It is certified that an error appears in the above-identified patent and that said Letters Patent is hereby corrected as shown below:

In Col. 6, line 6: "Hostafines" should read --Hostafines--

In Col. 8, line 43: "America" should read --America.--

In Col. 13, line 43: "Nuosept95" should read --Nuosept 95--

In Col. 14, lines 2, 4 and 12: "Preservative", "Preservative" and "Polymeric" should read --preservative--, --preservative-- and --polymeric--, respectively.

IN THE CLAIMS:

In Col. 16, line 43: "sulphonated" should read --sulfonated--

In Col. 16, line 51: "sulphonated" should read --sulfonated--

In Col. 18, line 7: "a naphthalene" should read --a sulfonated naphthalene--

Signed and Sealed this

Twenty-fifth Day of April, 2000

Attest:

Q. TODD DICKINSON

*Attesting Officer*            *Director of Patents and Trademarks*